(12) United States Patent
Wilson et al.

(10) Patent No.: US 8,683,203 B1
(45) Date of Patent: Mar. 25, 2014

(54) SUBSYSTEM AUTHENTICITY AND INTEGRITY VERIFICATION (SAIV)

(71) Applicants: Kelce S Wilson, Murphy, TX (US); Jeff A. Hughes, Dayton, OH (US)

(72) Inventors: Kelce S Wilson, Murphy, TX (US); Jeff A. Hughes, Dayton, OH (US)

( * ) Notice: Subject to any disclaimer, the term of this patent is extended or adjusted under 35 U.S.C. 154(b) by 0 days.

(21) Appl. No.: 13/727,625

(22) Filed: Dec. 27, 2012

Related U.S. Application Data

(63) Continuation of application No. 12/754,592, filed on Apr. 5, 2010, now Pat. No. 8,347,092.

(51) Int. Cl.
*G06F 21/00* (2013.01)
*G06F 21/81* (2013.01)
*G06F 21/86* (2013.01)

(52) U.S. Cl.
CPC ........... *G06F 21/81* (2013.01); *G06F 21/86* (2013.01)
USPC ............................................. 713/168; 726/36

(58) Field of Classification Search
None
See application file for complete search history.

(56) References Cited

U.S. PATENT DOCUMENTS 8,290,150 B2  10/2012  Erhart
2009/0083833 A1  3/2009  Ziola

FOREIGN PATENT DOCUMENTS

WO  WO 2009/024913 A2  2/2009

OTHER PUBLICATIONS

Associated Press, "Laptop With Explosives Sparks Munich Airport Scare", printed from www.foxnews.com on Jan. 20, 2010.

*Primary Examiner* — Gilberto Barron, Jr.
*Assistant Examiner* — Devin Almeida
(74) *Attorney, Agent, or Firm* — Kelce S. Wilson

(57) ABSTRACT

Systems and methods are disclosed for enhancing anti-terrorism public safety measures, by more securely determining whether explosives or other contraband have been inserted into notebook computer batteries or other large, replaceable subsystems of electronic devices. Because notebook computers typically require large, heavy batteries, they present attractive containers for smugglers and terrorists attempting to bring explosives onto an airplane. The disclosed security testing system provides more reliable results than many current tests, and does not require that the device under test be powered on. The systems and methods disclosed use out-of-band authentication for added security.

6 Claims, 6 Drawing Sheets

SUBSYSTEM AUTHENTICITY AND INTEGRITY VERIFICATION (SAIV)

CROSS REFERENCE TO RELATED APPLICATIONS

This is a continuation of U.S. patent application Ser. No. 12/754,592, filed Apr. 5, 2010, now U.S. Pat. No. 8,347,092, and claims priority thereto.

TECHNICAL FIELD

The invention relates generally to anti-terrorism public safety measures. More particularly, and not by way of any limitation, the application relates to detecting the tampering of battery-operated electronic devices in order to conceal explosives or other contraband.

BACKGROUND

Because notebook computers typically require large, heavy batteries, they present attractive containers for smugglers and terrorists attempting to bring contraband or explosives onto an airplane. Current security measures appear to reflect the awareness of this situation, because security personnel at airport security screening checkpoints often ask travelers to power on notebook computers. The theory behind this test is that, if the computer did not power up, the security officer would then suspect that the computer battery may have been removed and replaced with an explosive device or contraband. Additionally, given the fire and explosive hazards of lithium batteries in general the Transportation and Security Administration has recently issued new restrictions on the amount (specified in units of grams) of lithium that can be contained in specific batteries and still be transported on commercial aircraft.

Unfortunately, a simple power-on test, which lasts for a matter of mere seconds, is unable to indicate whether the entire battery has been replaced with a combination of a reduced-capacity battery and prohibited material. In order to spoof this overly-simplistic test, a smuggler can place a smaller capacity battery within the primary battery housing, along with the smuggled material. Likewise, in the case of counterfeit batteries, the screening procedures can only rely on the appearance of the battery package and the correctness of the associated labeling. Thus, the current tests fail to provide a meaningful level of security.

The enduring risk faced by millions of air travelers is evidence of a failure of others to supply a meaningful, effective, and yet conveniently rapid security test for electrical devices that are routinely carried onto airplanes and other attractive targets of terrorism.

BRIEF DESCRIPTION OF THE DRAWINGS

For a more complete understanding of the present invention, reference is now made to the following descriptions taken in conjunction with the accompanying drawings.

DETAILED DESCRIPTION OF THE INVENTION

To better highlight the advantages of the invention, a prior art authenticity verification system and its shortcomings will be described first.

Figure 3:
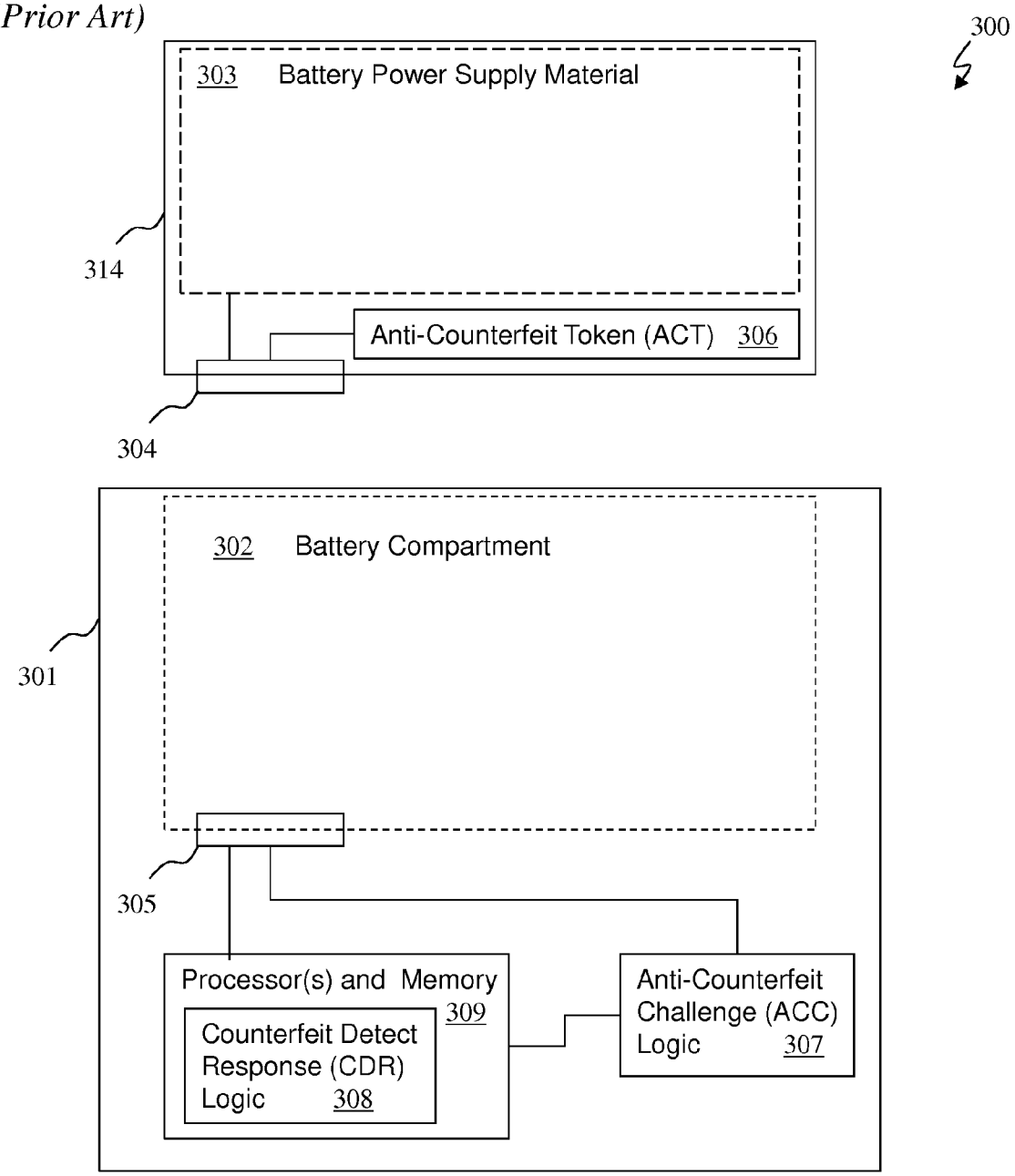
FIG. 3 illustrates a prior art notebook computer, having a component authenticity verification system.

FIG. 3 illustrates a prior art notebook computer 300, comprising main housing 301 having a battery compartment 302. Main housing 301 could be the base portion of a notebook computer, because notebook computers typically house the largest battery within the base, rather than the lid. Prior art battery 314 is sized and shaped to fit at least partially within compartment 302, and contains power supply material 303, which may comprise a dielectric gel and sheets of conductive material. In some embodiments, battery 314 could be another form of power supply such as a super-capacitor, because although super-capacitors operate on different principles than conventional rechargeable batteries, they often provide similar functionality as a portable power source. Battery 314 may fit entirely inside compartment 302, and then be enclosed with a door or panel, or else a portion of battery 314 may form part of an exterior portion of housing 301 so that when battery 314 is removed from housing 301, compartment 302 becomes an open cavity. Other attachment configurations could also be used.

Battery 314 also comprises a connector 304, through which power supply current flows in order to provide electrical power to components within housing 301 and also any other portions of notebook computer 300, such as a lid containing a display. Other signals may also flow through connector 304. A connector 305, disposed in housing 301, possibly partially within compartment 302 as illustrated, mates with connector 304 to bring in power supply current and other signals from battery 314, and also to send charging current, as well as other signals, to battery 314.

Battery 314 further comprises an Anti-Counterfeit Token (ACT) 306, which is accessed by Anti-Counterfeit Challenge (ACC) logic 307, illustrated as located within housing 301. The purpose of ACT 306 is to ensure that only batteries approved by a manufacturer of notebook computer 300 are used with housing 301. There are multiple reasons for this, which include product liability risk mitigation and revenue enhancement.

Batteries for notebook computers have a reputation for overheating and causing fires, and so must be carefully constructed in order to minimize risks. However, because rechargeable batteries often wear out while a computer still has otherwise useful life, they are commonly replaced by the owner. If an owner of a notebook computer uses a poor quality counterfeit replacement battery, which had been manufactured by a third party, and the counterfeit battery starts a fire in a notoriously litigious jurisdiction, the owner will be likely be inundated by promises of a large sum of money by contingency fee products liability lawyers who are searching for an excuse to file a lawsuit against the manufacturer, thereby incentivizing poor decisions and driving up costs of notebook computers for other consumers.

To minimize the risk of this scenario occurring, many computer manufacturers include authenticity verification systems in their devices that have replaceable parts, such as batteries, in order to prevent the use of replacement parts that had been supplied by unauthorized third parties. Additionally, this well-known liability mitigation strategy provides the manufacturer with an opportunity to generate an enhanced revenue stream, because the user is locked-in to purchasing replacement batteries only from the manufacturer, for the entire life of the computer. The replacement batteries can then be priced so high that the computer user will only just barely choose to replace the battery, rather than purchasing an entirely new notebook computer from a competitor of the manufacturer.

The illustrated ACT 306 and ACC logic 307 operate in this manner: ACC logic 307 sends a challenge to ACT 306. If ACT 306 responds correctly, then ACC logic 307 operates as if battery 314 is a legitimate, manufacturer-approved subsystem. If ACT 306 does not respond correctly, ACC logic 307 determines that battery 314 is counterfeit, and notifies Counterfeit Detection Response (CDR) logic 308, that is within or coupled to processor(s) and memory 309. CDR logic 308 then issues some alert to the user, or perhaps impairs operation of notebook computer 300. Together, ACT 306, ACC logic 307, and CDR logic 308 form an authenticity verification system for notebook computer 300.

Unfortunately, this system has a fundamental weakness: The shared secret, which enables ACC logic 307 to recognize ACT 306 as legitimate, is contained entirely within the environment that is under the control of whoever possesses notebook computer 300. Anyone who wishes to tamper with notebook computer 300 can intercept and monitor signals passing through connectors 304 and 305 when both legitimate and counterfeit batteries are used. Using the monitored signals, the secrets contained in ACT 304 can be reverse-engineered and forged, or otherwise spoofed. Alternatively, one or more of ACC logic 307 and CDR logic 308 can be disabled. One of more of these attacks can be accomplished by someone with sufficient motivation, and the manufacturer of notebook computer 300 must rely on the effort needed for these attacks to simply be too much of an inconvenience for the majority of consumers to justify saving some money on a battery replacement.

However, terrorists, who intend to bring down an airplane and kill hundreds of people, may spend years preparing for the operation, and also may be well-funded. Additionally, some smugglers of expensive contraband may find the inconvenience of the attacks to be an acceptable cost. Thus, the prior art authenticity verification system of notebook computer 300 is unsuitable for reliable security and anti-smugglings efforts, and is subject to compromise as is illustrated in FIG. 4.

Figure 4:
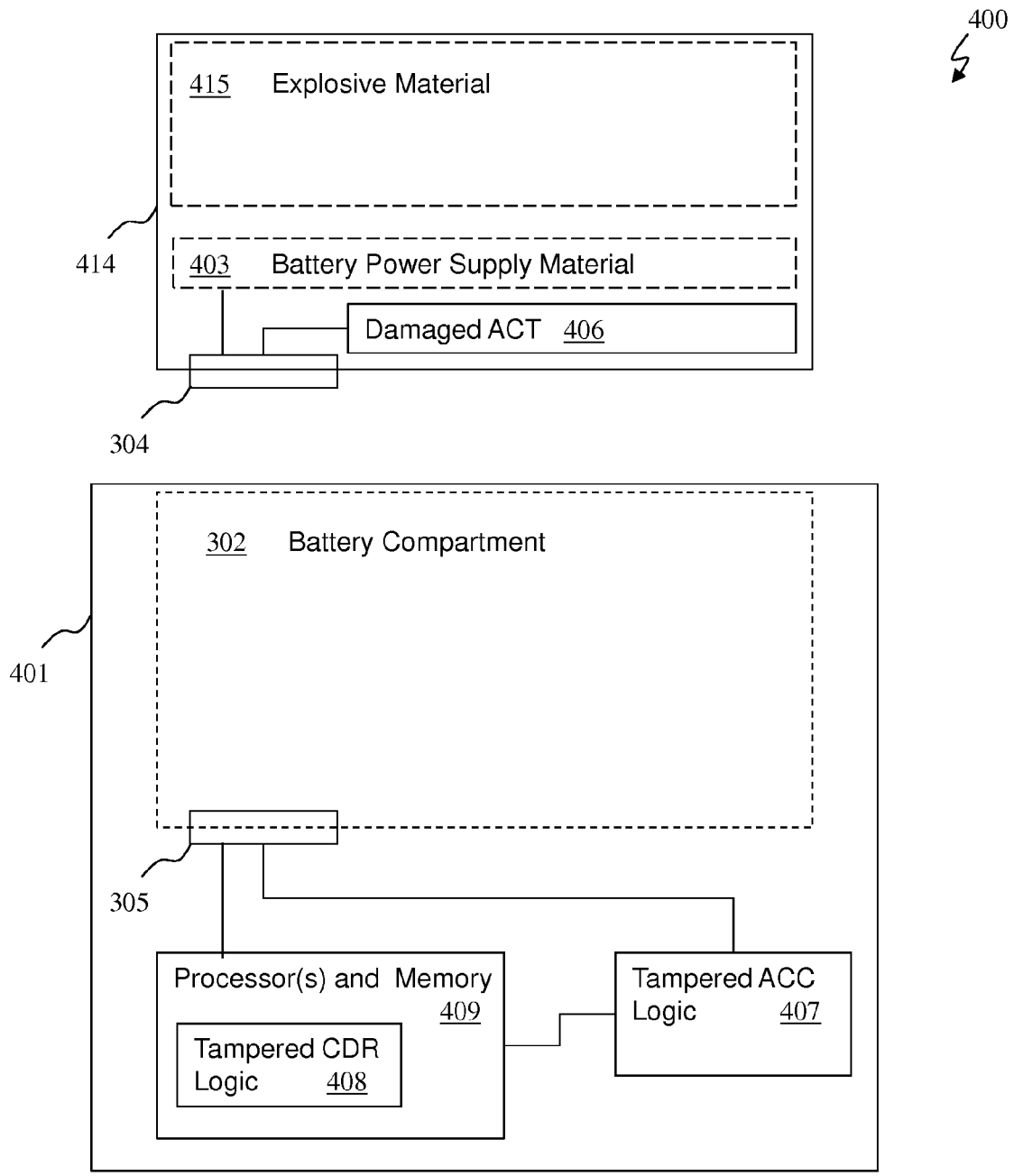
FIG. 4 illustrates a tampered notebook computer.

FIG. 4 illustrates a tampered notebook computer 400. In FIG. 4, housing 401 has been prepared to accept battery bomb 414 into battery compartment 302. Battery bomb 414 contains explosive material 415, although drugs or other contraband could also be hidden inside a battery casing. In the process of prying open the casing of battery bomb 414, ACT 406 had been damaged. Although a prior art authenticity verification system would be poised to catch this damage—the authenticity verification system in tampered notebook computer 400 has been rendered ineffective.

The bomber or smuggler has anticipated a demand for a power-on test at a security checkpoint, and so has tampered with ACC logic 407 to blind it to an incorrect response from damaged ACT 406. Alternatively CDR logic 408, located within or coupled to processor(s) and memory 409, could have been tampered to ignore an alert from ACC logic 407. Possibly, because the smuggler recorded traffic between connectors 305 and 306, prior to damaging ACT 406 by tampering, ACT 406 could have been repaired, or a forged system that mimics the behavior of undamaged ACT 206 could be placed within battery bomb 414. Combinations of these three attacks could be used to enhance the reliability of the intended deception. In any case, the authenticity verification system in notebook computer 400 will fail to alert a security screener to the tampering of battery bomb 414.

The bomber or smuggler then addresses the need of passing an anticipated power-up test as a security checkpoint. The test will have only a very short duration, because the security line will be long, and security screeners generally only have a short amount of time to spend with each person. So only enough power capacity is required within battery bomb 414 to enable a few boot-up sequences and possibly power a detonator receiver. Because the original battery contained enough power supply material to power a notebook computer for several hours, and because the amount of decoy power supply material 403 only needs to provide operation for a small fraction of this time, decoy power supply material 403 will only need to occupy only a small percentage of the volume of the housing of battery bomb 414. The majority of the volume of the housing of battery bomb 414 is thus available to use for housing explosive material 415. If battery bomb 414 had used the case of an extended life battery, the amount of explosive material 415 that could be fit within the housing could be significant.

Although saving money on battery replacements may not provide sufficient motivation for such tampering, as described for FIG. 4, more sinister opportunities can provide sufficient motivation. Hijacking a cruise ship, or destroying a flying airplane that is full of passengers, is likely to easily motivate kidnappers and terrorists to bypass prior art authenticity verification systems, such as the system illustrated in FIG. 3.

One example of a successful tampering scenario would be that hijackers intend to smuggle several bomb-laden notebook computers onto a cruise ship and hide them in a plurality of critical locations. Then, after detonating one of the computer bombs while the ship was at sea, the hijackers could demand control of the entire ship, using the threat of detonating additional bombs to coerce the crew and passengers to cooperate and refrain from escaping or searching for the remaining bombs.

What about reliance upon x-ray machines and chemical sensors for security? These security tests are similarly vulnerable to defeat by a properly-motivated person. Because virtually anyone with sufficient resources can see how power supply material 303 appears to an operator of an x-ray machine, explosive material 415 can be disguised to have a similar appearance. Also, because battery bomb 414 can be sealed to be both watertight and airtight, it can be chemically washed after explosive material 415 is inserted, to be sufficiently clean that commonly-used chemical sensors at security checkpoints will fail to identify any chemical signatures of explosives residue. Therefore, because Applicants (and presumably the patent Examiner, as well) wish to avoid being killed by terrorists, a more secure system is needed.

Figure 1:
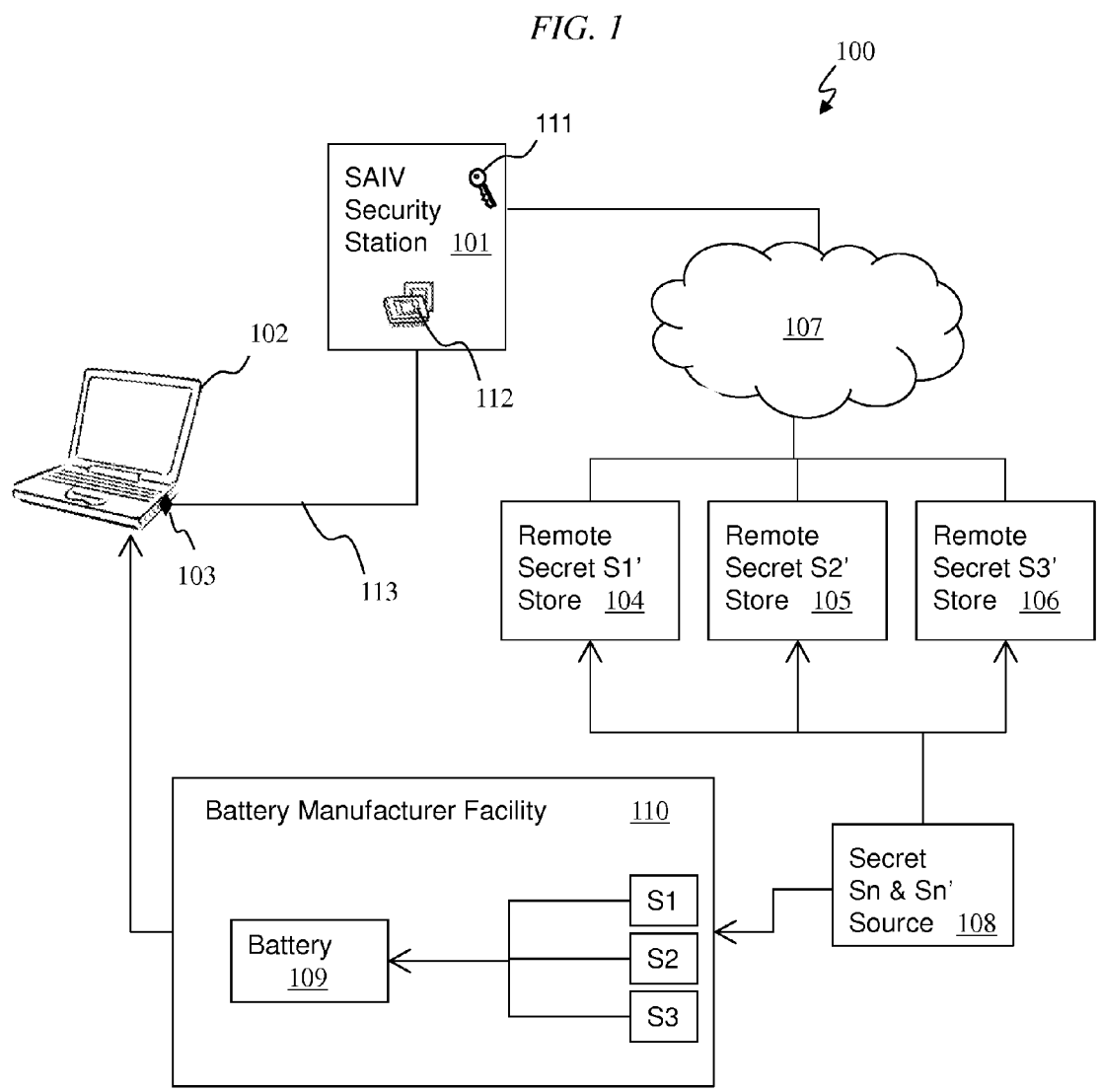
FIG. 1 illustrates an embodiment of a subsystem authenticity and integrity verification (SAIV) security testing system.

Turning now to FIG. 1, an embodiment of an improved security system is illustrated: a subsystem authenticity and integrity verification (SAIV™) security testing system 100. A SAIV security station 101 is coupled to a SAW-compliant notebook computer 102, through a SAIV security port 103. Port 103 can be configured to have an existing form factor, such as a USB or Ethernet connector, or can have a unique form factor that is not compatible with other common connectors and includes its own ACT circuitry. The reduced availability of a connector, for example through tightly-controlled manufacturing and the use of ACT circuitry integrated into the connector, along with a tamper-evident design, can offer some improvements in security by raising the cost of successful tampering. However, a sufficiently-funded person could still forge even an ostensibly secure connector.

Figure 2:
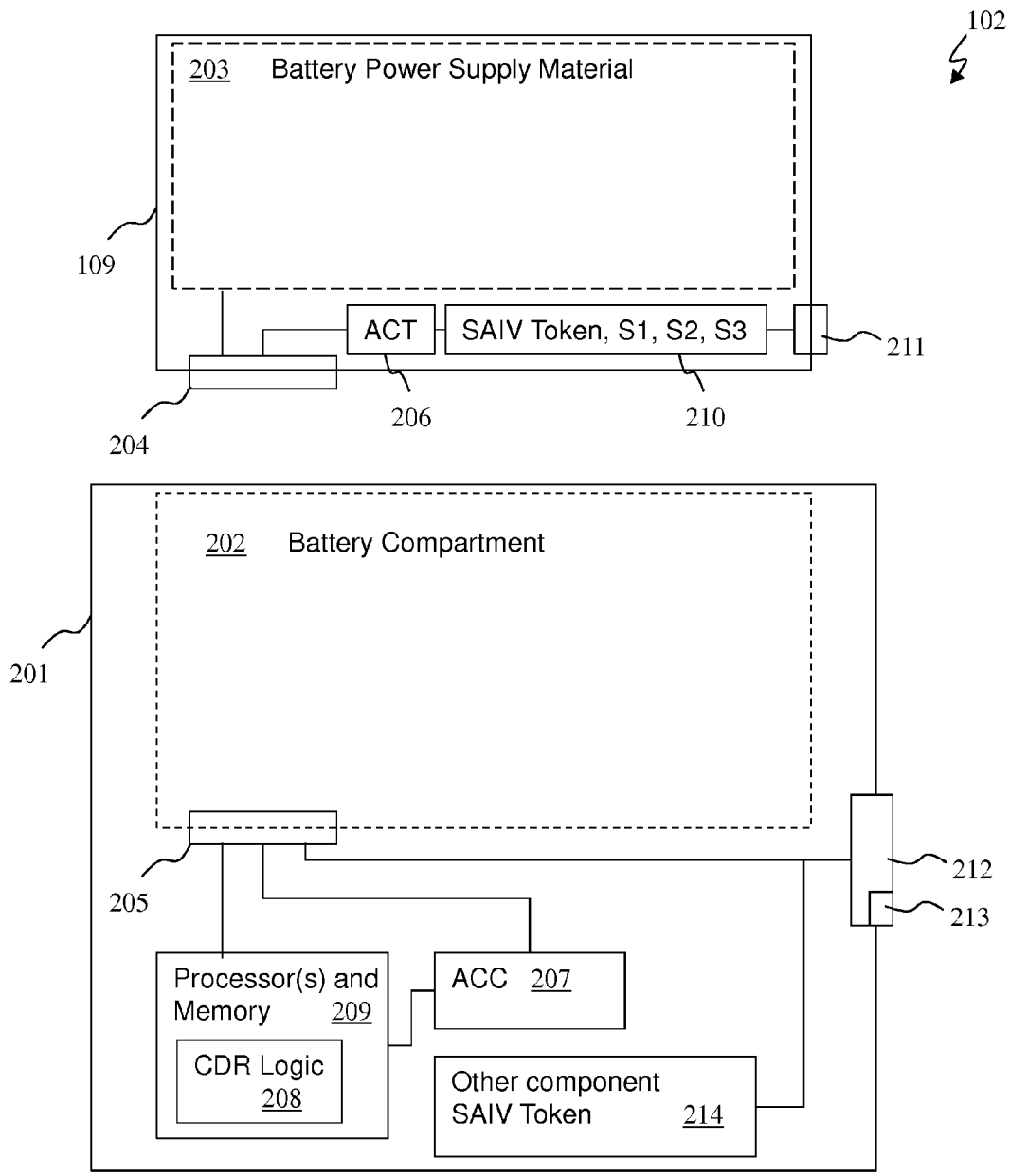
FIG. 2 illustrates an embodiment of a notebook computer that is prepared for security screening with a SAIV system.
Figure 5:
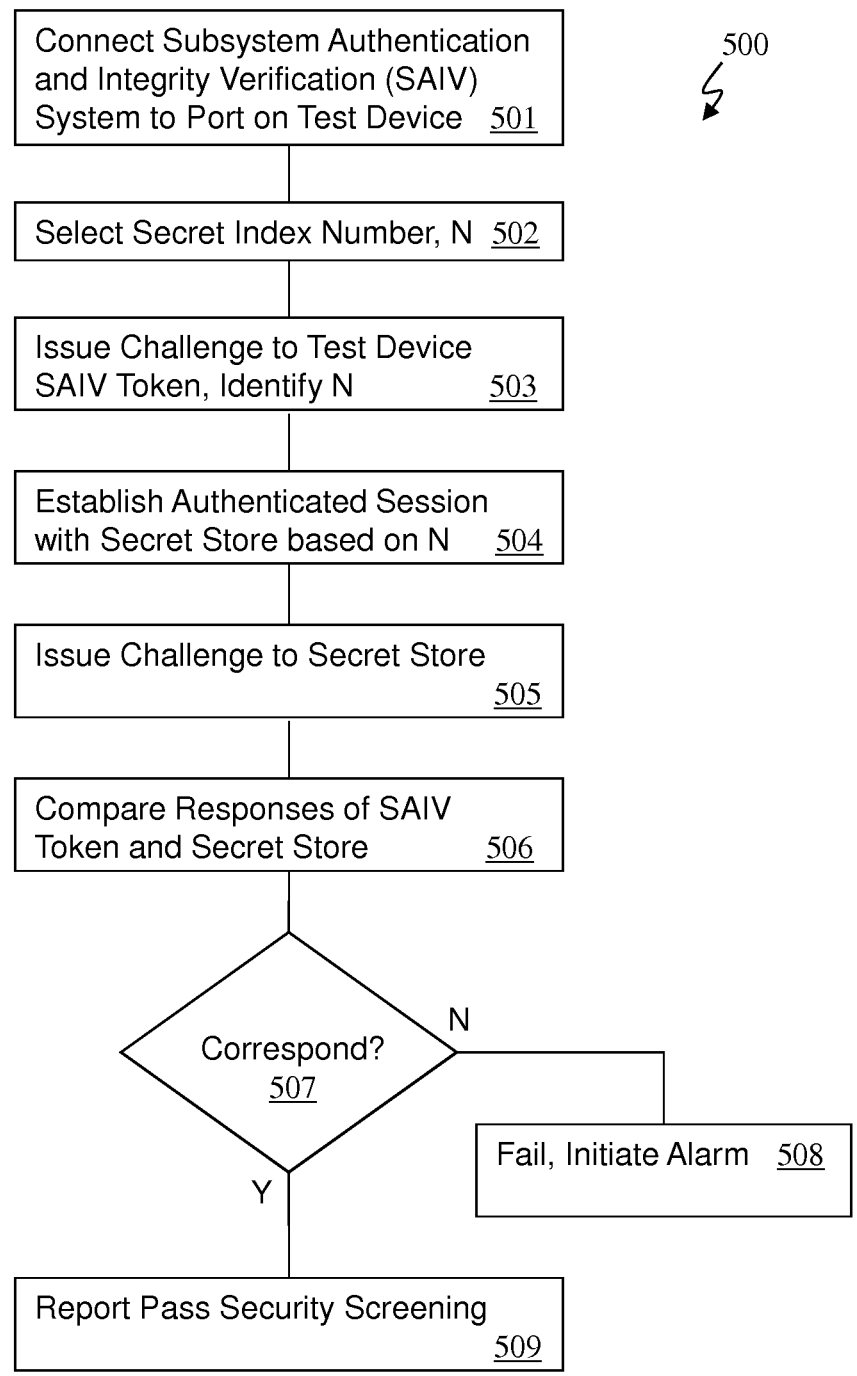
FIG. 5 illustrates a method of performing authenticity and integrity verification.
Figure 6:
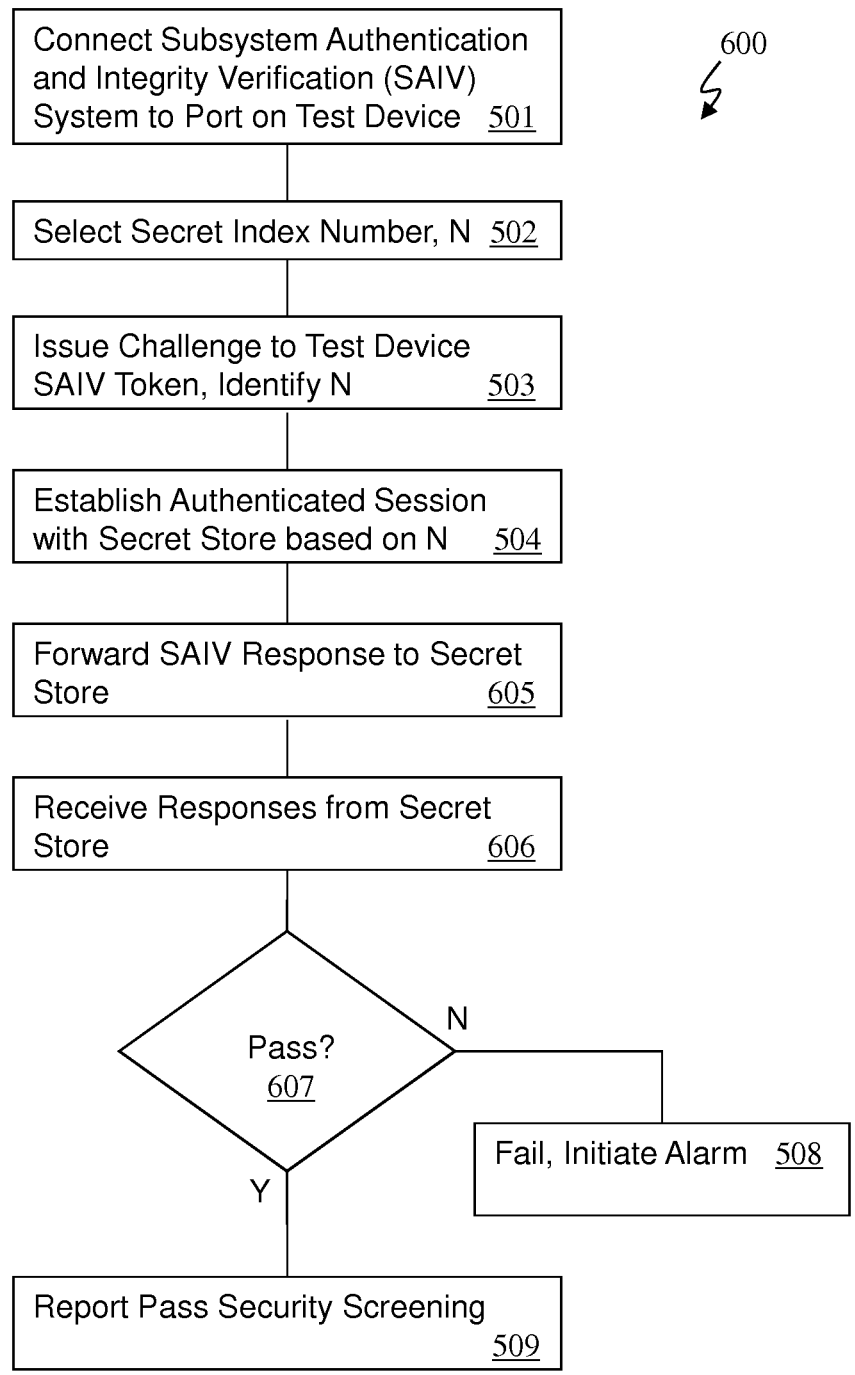
FIG. 6 illustrates another method of performing authenticity and integrity verification.

SAIV-compliant notebook computer 102 is described in more detail in FIG. 2, and some representative methods of operating security testing system 100 are described in FIGS. 5 and 6. However, returning to FIG. 1, it can be seen that SAIV security station 101 is coupled to a plurality of remote secret stores, illustrated as remote secret stores 104-105, through a computer network 107, which may be the internet or a dedicated network. Although three remote secret stores are illustrated, it should be understood that a different number can be used. As will be described shortly, there is an increasing advantage in using a larger number of separate remote secret stores.

As illustrated, remote secret store 104 contains secret S1', remote secret store 105 contains secret S2', and remote secret store 106 contains secret S3'. These secrets S1'-S3' were generated at a secret source facility 108, which correspond with a respective one of secrets S1-S3 that are in battery 109. Secret source facility 108 could be a government-run facility for providing S1-S3 to a government-approved battery manufacturer, or alternatively, could be part of battery manufacturing facility 110 and be operated by the manufacturer itself to distribute battery 109 and secrets S1' and S3'. In either case, security will be enhanced of each of remote secret stores 104-105 has access to only its assigned secret, selected from S1'-S3', but not the other secrets. For example, remote secret store 104 will not have access to either secret S2' or S3', nor will security station 101 have access to any of S1'-S3'. Thus, even if remote secret store 104 is compromised by hackers, secrets S2' and S3' can remain uncompromised. Additionally, no secrets will be compromised, even if security station 101 is stolen or compromised by hackers. Each of S1'-S3' is unique to battery 109, so that other batteries made at battery manufacturer facility 110 will have a different set of secrets, and therefore each of remote secret stores 104-105 will have a database covering many different batteries.

Authenticity verification using shared secrets is well known in the art. For some systems S1=S1', S2=S2', and S3=S3', although for other systems S1-S3 are uniquely paired with a respective one of S1'-S3', but contain different information. One example for Sn=Sn' would be this: Security station 101 generates a data stream by selecting a random number and combining it with a time stamp and a security token ID code key 111 that uniquely identifies security station 101 relative to other SAIV security stations. Security station 101 checks port 103 for integrity, issues an alert if port 103 fails, but if port 103 passes, security station then sends the generated data stream through port 103, requesting use of S2. A SAIV security token module within a replaceable subsystem of notebook computer 102, for example battery 109, encrypts the data stream with S2 as the key in a symmetric encryption operation. Security station 101 retrieves the result from notebook computer 102, along with an ID code for the subsystem, and forwards this new data stream through computer network 107 to remote secret store 105. At remote secret store 105, S2' (which should be equal to S2 in this example) is identified in the database, indexed by the ID code for the subsystem within notebook computer 102. Remote secret store 105 returns the decryption result, which will only be correct for a symmetric encryption operation if S2' actually does equal S2. Upon comparing the result returned from remote secret store 105, and noting equality, security station 101 has verified the correctness of S2 within battery 109. This also verifies the integrity and authenticity of battery 109, if battery 109 had been constructed such that any tampering would destroy S2 information.

Alternatively, security station 101 could first retrieve the ID code for the subsystem, send a generated data stream to a selected one of remote secret stores 104-105 for encryption, possibly including key 111, a timestamp, and a random number, and then forwards the returned result through port 103. The selection of the specific one of remote secret stores 104-106 can be random or deterministic, but should avoid any one of remote secret stores 104-106 that is known to have been compromised. Each secret, S1-S3, within battery 109 could then be used to attempt decrypting the result that had been returned from the selected remote secret store. Security station 101 then checks all decryption results fro notebook computer 102, and only one should have been decrypted properly.

An example of Sn corresponding to Sn', but Sn not equaling Sn', would be if Sn and Sn' comprised a key pair for an asymmetric encryption operation, for example public key encryption. This way, a data stream encrypted with Sn could only decrypt properly with Sn', and a data stream encrypted with Sn' could only decrypt properly with Sn. The use of a timestamp and a random number helps reduce vulnerability to a replay attack. Additionally, if security station 101 keeps track of recently-encountered subsystem ID numbers, and shares such information with other operating security stations, a cloned subsystem can be detected. For example, if security station 101 checked a subsystem with a particular ID, then within some time-out threshold, a similar security station known to be operating a far distance away encountered the same number, or else security station 101 encountered that same ID again itself, security station 101 could generate an alert that the subsystem is likely to have been cloned.

Physically unclonable functions (PUFs) can offer some protection against cloning secrets that are used for authenticity and integrity verification. PUFs are described in patent application publications, WO 2009/024913, US 2009/0083833, and US 2008/0279373, which are incorporated by reference as teachings of the prior art on the use of PUFs in device authentication. Integrity verification can be accomplished by a number of tamper-evidence protections that result in the destruction or loss of information in the event that tampering occurs. These can include the storage of critical information on a medium that rapidly decomposes upon exposure to light or air, so that if battery housing 109 is opened after it had been sealed at battery manufacturing facility 110, all secrets S1-S3 are immediately and irretrievably lost or altered by the decomposition of material storing the secrets. Other methods include the use of gas pressurization, a pressure sensor, and a reserve battery charge that can be used to melt logic circuitry containing S1-S3. Also small wires can be used that will break upon opening a battery case, thereby providing a logic indication when a voltage signal carried on the wires is lost, and a self-destruct procedure can be triggered by the logic indication. Active sensors, such as vibration, light, and electrical resistance can be used to detect tamper efforts, aimed at retrieving secrets S1-S3 for use in a replay attack. A volatile non-imprinting memory device, embedded within battery 109, can store secrets S1-S3 and can be powered by the main battery, because it would probably never fully discharge and the number of bits comprising the secrets S1-S3 would not require much power to keep alive. Combinations of these methods, and other methods that are known in the art, can also be used.

Security station 101 is illustrated as comprising processor (s) and memory 112, which performs computations and executes logic to implement methods described herein, for example by running a computer program that is configured to be executed by one or more processors of processor(s) and memory 112. A cable 113 is also provided, for coupling security station 101 to port 103. Although a wireless coupling could be used, for example a T-coil, a radio frequency (RF) shielded wired connection is generally more secure. This is because a strong RF signal from a more distant source can overpower a weaker signal from a closer source, and unless further precautions are taken, this can lead to confusion about which system is undergoing security inspection. Security station 101 can comprise any components that are associated with computers, such as a video display and other storage devices, including firmware, non-volatile memory, optical and magnetic storage mediums, and other computer readable mediums that may store computer programs and data (including key 111 and associated logic), that perform any of the methods described herein.

It should be noted that several concepts are introduced with the disclosed SAIV system. These include that the challenge/response authentication is moved out of band, such that an attacker, who has possession of notebook computer 103 and has even hacked into security station 101, does not have access to all the information that is necessary to verify authenticity and integrity for a protected subsystem, such as battery 109. No shared secret is entirely within the control of a person possessing notebook computer 102 or operating security station 101, because a remote secret store, one of 104-106, has the other portion of the information.

The use of multiple remote secret stores provides redundancy in the security methods that can be leveraged to preserve trust in a protected subsystem, in the event that one of the secret stores is compromised. Coupling of security station 101 directly to a SAIV token within a subsystem, without going through any logic controlled by notebook computer 102, reduces the likelihood of secret spoofing. The system will likely be more secure if SAIV port 103 is directly on a tamper-evident enclosure of the protected subsystem, because any signal path within notebook computer 102 provides opportunities for spoofing, hidden from a security screener operating security station 101.

Turning now to FIG. 2, notebook computer 102 will be described in more detail. Notebook computer 102 comprises main housing 201, having a battery compartment 202. Battery 109 is sized and shaped to fit at least partially within compartment 202, and contains power supply material 203. Other power supply systems, besides rechargeable batteries that store energy chemically, could also be used, as well as multiple attachment configurations.

Battery 109 also comprises a connector 204, through which power supply current flows to power components within housing 201. Other signals may also flow through connector 204 or another, separate connector. A connector 205, disposed in housing 201, mates with connector 204 to communicate power supply and charging current and possibly other signals. Battery 109 further comprises an ACT 206, which is accessed by ACC logic 207 in housing 201. ACC logic 208 then communicates with CDR 208, which is within or coupled to processor(s) and memory 209. Memory in processor(s) and memory 209 comprises a computer readable medium, which may include volatile random access memory (RAM), non-volatile RAM, optical media, magnetic media, and other non-transitory media.

Battery 109 additionally comprises a SAIV token 210. Token 210 has at least one secret that is not shared with or otherwise determinable from any other part of notebook computer 102. Thus, information needed to verify the authenticity of token 210 has been moved out of band. As illustrated, token 210 contains three secrets, S1, S2, and S3, although a different number could be used. A plurality of secrets provides back-up trust for token 210, in the event that one of the secrets is compromised. Additionally, token 210 comprises an ID code and may also comprise logic and processing capability, for example symmetric or asymmetric encryption, in order to encrypt or decrypt an incoming data stream with one or more of S1-S3. Token 210 can then return the result of this logic operation, along with the ID code, or could return the ID code and logic operation result at separate times. Token can perform these operations without the need to power on notebook computer 102, thereby saving time at the security screening checkpoint. Processor(s) and memory 209 are not powered-on or put into a boot-up sequence.

As illustrated, token 210 is coupled to SAIV ports 211 and 212, although only one of the ports may be needed. Either one of ports 211 and 212 can perform the functions described for port 103 in FIG. 1. Port 211 is directly coupled, within the housing of battery 109, and therefore provides more tamper-evidence than the use of port 212. However, the use of port 211 makes it desirable that at least a portion of the housing of battery 109 be accessible from outside notebook computer 102. Being able to rapidly connect security station 101 to a SAIV port on notebook computer 102, without opening notebook computer 102, minimizes inspection time at a security screening station. This is desirable, because every second of delay in the screening process can accumulate to make wait times excessive when lines are long at a screening station.

Token 210 is also illustrated as connected to port 212 through connectors 204 and 205, although it should be understood that other connection configurations can be used. Although this particular configuration can be used if necessary, for example if battery 109 is inaccessible to external cable 113, any wiring between connector 205 and port 212 provides a connection point for intercepting and spoofing communication between security station 101 and token 210. As illustrated, port 212 has its own integrated ACT circuitry 213. Port 211 may also have an integrated ACT circuit.

FIG. 5 illustrates a method 500 of performing authenticity and integrity verification, which may be performed by security station 101. In box 501, cable 113 is connected to one of ports 211 and 212. Security station 101 then checks the authenticity of the port connector, for example by using ACT 213 or an equivalent ACT in port 212. This checks the port itself for tampering or forgery, which is primarily useful of the prt connectors are controlled-manufacture devices with a unique form factor. If tampering is detected, security station 101 generates an alarm for the security screener, perhaps by sounding an audible alert ad/or displaying a message I a video display. Otherwise, security station 101 begins communicating with token 210, which is a security token within a removable subsystem of notebook computer 102, and method 500 proceeds to box 502. A number N is selected for testing a secret Sn, although in some embodiments of method 500, multiple secrets may be selected for testing.

In box 503, a data stream is generated to be used in a challenge-response communication between processor(s) and memory 112 within security station 101, and token 210 within battery 109. As described previously, this data stream can include the combination of a random number, a time stamp, and key 111 that is unique to security station 101. Thus, each time token 210 receives a challenge, it will be different. With this scheme, even two different security stations that coincidentally used the same random number at exactly the same time would generate different challenges. The data stream may be processed using a one-way function, such as a hash function, prior to being communicated outside security station 101, in order to prevent reverse-engineering of key 111.

Token 210 returns a response, which includes an ID code, and method 500 continues with box 504. Security station 101 sets up a secure authenticated communication session with one or more of remote secret stores 104-106 through computer network 107. Secure authenticated internet sessions are well-known in the art, as well as secure authenticated sessions for private computer networks. The authenticated session permits security station 101 to have a degree of confidence that it is actually communicating with the selected one of remote secret stores 104-106, rather than a spoofed site that is posing as a remote secret store. In box 505, the ID code and response from token 210 are forwarded by security station 101 to the remote secret store, which selects the Sn' corresponding to battery 109, using the ID code as an index in a database of secrets for multiple subsystems, processes the data stream using Sn'. This result is then returned to security station 101.

Variations can exist in method 500, specifically regarding boxes 503 and 505. For example, as described earlier, security station 101 can obtain the ID code from token 210 first, perform the steps of boxes 504 and 505, and then perform the remaining steps of box 503 using the response from the selected remote secret store. Further, security station can poll multiple secrets within token 210, with the expectation that one and only one should match. This variation prevents an attacker from identifying which secret is being used for authentication. There is a possibility that an attacker can pass multiple specially-configured versions of notebook computer 102 through a security checkpoint, in an attempt to ascertain whether security station 101 uses one secret index number N more often than others. If security station 101 polls every one of the secrets every time there is a connection, then such information will be hidden from an attacker. It should be understood though, that multiple secrets could be used for additional confidence in the procedure, such that authenticity and integrity are reported if all secrets pass the challenge/response procedure, but a tampering alarm or alert is generated if one of the secrets fails.

In box 506, the responses are compared within security station 101, and a decision is made responsive to the comparison, in box 507. If Sn and Sn' are not properly corresponding secrets in a secret pair, then an alarm will be generated in box 508. However, if they do correspond, security station 101 will report that the screening has passed in box 509.

FIG. 6 illustrates another method 600 of performing authenticity and integrity verification. The primary difference between methods 500 and 600 is in where the pass/fail determination is made. In method 500, the determination is made by security station 500, whereas in method 600, the determination is made remotely, for example at one of remote secret stores 104-106. Starting the description of the difference at box 605, the response and ID from token 210 are sent to a remote secret store, which uses its local copy of Sn' to make the pass/fail decision. This is communicated back to security station 101, in box 606, and security station then makes its local pass/fail decision in box 607.

Using the systems and methods disclosed, an embodiment of computer implemented method for determining authenticity and integrity of a subsystem of a notebook computer, may be performed. Embodiments of the method may be performed using a computer program that is executable by a processor and embodied on a computer readable medium. An embodiment of the method comprises: communicating, from a security station, with a security token within a replaceable subsystem of the notebook computer to perform a challenge/response operation with the security token using a first secret stored in the security token, without powering on the notebook computer, thereby receiving a first response, formed using the first secret, from the security token. An example of a challenge/response operation is sending data for encryption or decryption, in which the secret provides key material for the encryption or decryption operation. The embodiment further comprises: communicating, from the security station, with a remote secret store in an authenticated communication session over a public computer network to perform a challenge/response operation with the remote secret store using a second secret stored in the remote secret store, thereby receiving a second response, formed using the second secret, from the remote secret store. The embodiment further comprises comparing the first response with the second secret for correspondence; and responsive to the comparison, generating a failure alarm if the comparison indicates no correspondence between the first secret and the second secret, and generating a pass indication if the comparison indicates correspondence between the first secret and the second secret.

Correspondence can be indicated by both the first and second responses having at least one portion that is equivalent, or by the first response comprising an encrypted version of a first challenge, the second challenge being at least a portion of the first response, and the second response having a portion that is equivalent to at least a portion of the first challenge. The embodiment may further comprise communicating, from the security station, with the security token to perform a challenge/response operation with the security token using a third secret stored in the security token, without powering on the notebook computer; and comparing the responses from the security token using the third secret and the remote secret store using the second secret, wherein the pass indication is generated even if the comparison indicates no correspondence between the third secret and the second secret. This can be a practical result, even for a failed comparison, when the method compares multiple secrets within one of the security token and the remote secret store with one or more secrets within the other one of the security token and the remote secret store. The security station has no need to permanently store any of the secrets locally, and in some embodiments, the security station may never possess any of the secrets, but merely the resulting responses.

Although the invention and its advantages have been described herein, it should be understood that various changes, substitutions and alterations can be made without departing from the spirit and scope of the claims. Moreover, the scope of the application is not intended to be limited to the particular embodiments described in the specification. As one of ordinary skill in the art will readily appreciate from the disclosure, alternatives presently existing or developed later, which perform substantially the same function or achieve substantially the same result as the corresponding embodiments described herein, may be utilized. Accordingly, the appended claims are intended to include within their scope such alternatives and equivalents.

We claim:

1. A battery operated electronic computing apparatus, the apparatus comprising:
   a housing having a battery compartment;
   a processor and memory within the housing;
   a first connector coupled to the processor and memory and located to enable coupling with a battery installed in the battery compartment;
   an authenticity verification system accessible by the processor, the authenticity verification system comprising anti-counterfeit challenge (ACC) logic and counterfeit detection response (CDR) logic, wherein the authenticity verification system is operable to detect a counterfeit battery;

a battery; and a security token within the battery and accessible by an external security station that is outside of the housing and separate from the electronic computing apparatus, wherein the security token is configured to enable an external security station to detect tampering of the battery without powering on the electronic computing apparatus.

2. The apparatus of claim 1 further comprising:

a second connector on the housing and coupled to the first connector, wherein the security token is coupled to the first connector, and wherein the security token is accessible to an external security station through the first and second connectors.

3. The apparatus of claim 1 further comprising:

a third connector on the battery, wherein the security token is coupled to the third connector, and wherein the security token is accessible to an external security station through the third connector separately than through the first connector.

4. A battery operated electronic computing apparatus, the apparatus comprising:

a housing having a battery compartment;

a processor and memory within the housing;

a first connector coupled to the processor and memory and located to enable coupling with a battery installed in the battery compartment;

a battery; and a security token within the battery and accessible by an external security station that is outside of the housing and separate from the electronic computing apparatus, wherein the security token is configured to enable an external security station to detect tampering of the battery without powering on the electronic computing apparatus.

5. The apparatus of claim 4 further comprising:

a second connector on the housing and coupled to the first connector, wherein the security token is coupled to the first connector, and wherein the security token is accessible to an external security station through the first and second connectors.

6. The apparatus of claim 4 further comprising:

a third connector on the battery, wherein the security token is coupled to the third connector, and wherein the security token is accessible to an external security station through the third connector separately than through the first connector.

\* \* \* \* \*